No. 665,914. Patented Jan. 15, 1901.
F. J. A. KINDERMANN.
OIL CAN.
(Application filed Oct. 27, 1900.)

(No Model.)

WITNESSES:
Ella L. Giles
Otto Munk

INVENTOR
Franz Joachim Alexander Kindermann
BY
ATTORNEYS

THE NORRIS PETERS CO., PHOTO-LITHO., WASHINGTON, D. C.

UNITED STATES PATENT OFFICE.

FRANZ JOACHIM ALEXANDER KINDERMANN, OF MELBOURNE, VICTORIA.

OIL-CAN.

SPECIFICATION forming part of Letters Patent No. 665,914, dated January 15, 1901.

Application filed October 27, 1900. Serial No. 34,592. (No model.)

*To all whom it may concern:*

Be it known that I, FRANZ JOACHIM ALEXANDER KINDERMANN, a subject of the Emperor of Germany, residing at No. 259 Elizabeth street, Melbourne, in the Colony of Victoria, have invented a certain new and useful Oil-Can, of which the following is a specification.

My invention provides an oil-can for use in lubricating machinery and which is provided with an efficient means of controlling the flow of oil from the can at will of the user.

In order that the invention may be thoroughly understood, I will describe same with reference to the accompanying sheet of drawings, in which—

Figure 1:
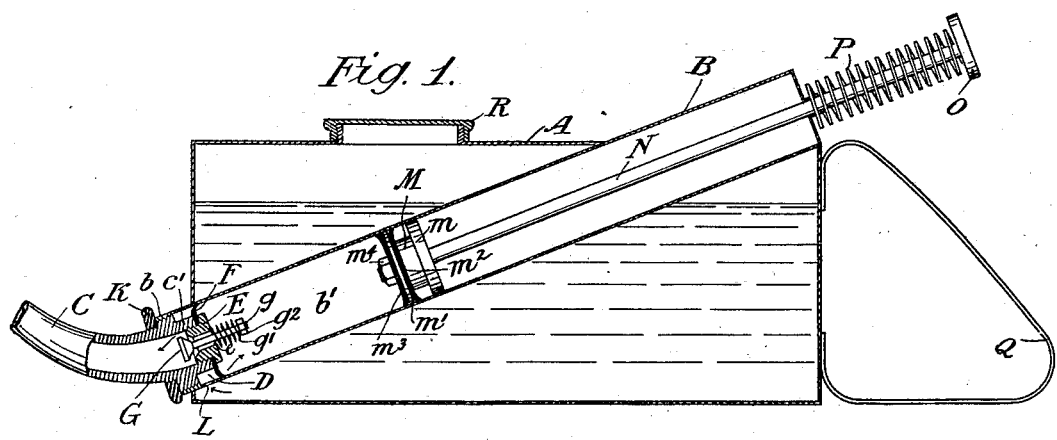
Figure 2:
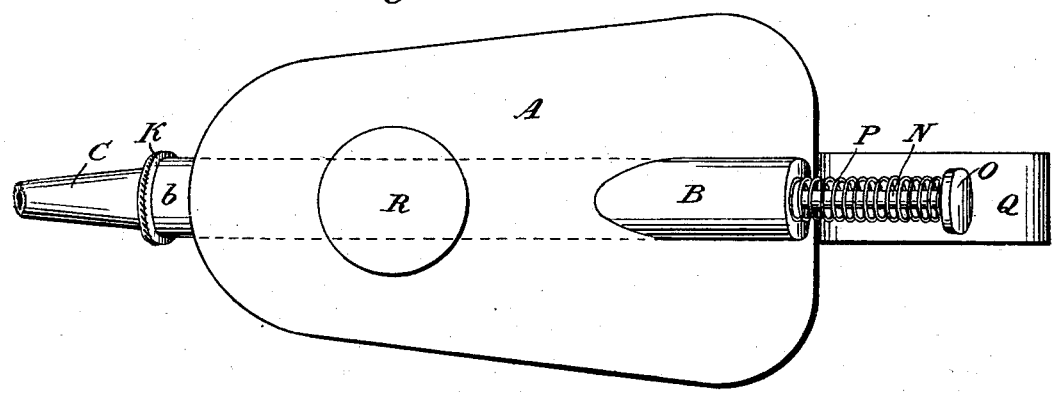

Figure 1 shows a vertical longitudinal section taken through the can. Fig. 2 shows a plan of the can.

A represents the oil-chamber, in which is set a cylinder B. This cylinder proceeds diagonally through the can and is inclined downwardly from the back of same to the front. Into the forward end $b$ of this cylinder is screwed the end of the outlet-pipe C of the oil-can. This pipe (shown cut off in the drawings) is tapered and curved in the manner well known. The parts are held firmly in position by means of the screw-ring K. The base of the pipe C has an extended portion $c'$ and which has an internal screw-thread. The end of the pipe C is closed by screw-nut E, and a leather washer F, which impinges upon the cylinder B, is set between end of pipe and nut. An annular space D is left between the cylinder B, and a hole L (or holes) form a communication between the oil-reservoir A and the annular space D and such extended portion of C. The screw-nut E has a hole $e$ through its center and one end of same is beveled to form a seating for a valve G. This valve is set on rod $g$ and which projects through the said hole, and the projecting portion has a spiral spring $g'$ encircling it and which is kept in place by nut $g^2$. The spring thus tends to keep the valve close upon upon its seat.

I provide a piston M in the cylinder B. The piston may be constructed, as illustrated on Fig. 1, of metal disks $m$ and $m'$, with leather washer $m^2$ between them and a washer $m^3$ beyond the disk $m'$, the whole being held in position by nut $m^4$, screwed onto piston-rod N. The piston-rod extends outside the cylinder B and has a disk O or the like at its end, and a spiral spring P encircles the rod between the said disk and end of cylinder.

Q represents handle of the oil-can, and R screw-cap which covers opening to can for supply of oil. Any suitable device may be here employed for the supply of oil to the can.

The *modus operandi* of the invention is as follows: Assuming the disk O to have been pressed and the piston to be in its forward position, on releasing the pressure of the thumb from the disk the spiral spring P will cause the piston to be drawn back, so causing a suction, which will draw oil from the reservoir A, through the hole (or holes) L, into the annular space D and beneath the leather valve F, as indicated by the arrows in Fig. 1, into the chamber $b'$ of the cylinder B. The valve G during this backward stroke of the piston will remain closed. The normal condition will thus be that a body of oil will lie in the chamber $b'$, the valve G being closed. By pressing the disk O, and thus forcing the piston forward, the valve G will open and the oil will be forced from the chamber $b'$, through the opening $e$, into the pipe C. The pressure which thus opens the spring-valve G will close the leather valve F against the pipe. A perfect control of the oil-flow from the can will in this manner be obtained, the fluid exuding synchronously with the pressure of the thumb on disk O, the fine opening at the end of C disallowing any escape when no pressure is made on such disk.

Having now particularly described and ascertained the nature of my said invention and in what manner the same is to be performed, I declare that what I claim is—

1. In combination, an oil-can provided with a cylinder in which is set a piston, means for operating the piston, an outlet-pipe communicating with the cylinder and having valve at its end, an annular space in the cylinder surrounding the inwardly-projecting inner end of said pipe and communicating with the oil-reservoir and an annular valve dividing said annular space from main body of cylinder substantially as and for the purposes set forth.

2. In combination an oil-reservoir A, cylinder B set diagonally in same, a piston in the cylinder having rod N with disk at end and spiral spring P acting upon disk, an outlet-pipe C communicating with cylinder and having extension c', a valve F at end of extension, an annular chamber D communicating with oil-reservoir, a screw-nut E at end of pipe extension and a spring-valve G in same substantially as and for the purposes set forth.

In testimony whereof I have signed my name to this specification in the presence of two subscribing witnesses.

FRANZ JOACHIM ALEXANDER KINDERMANN.

Witnesses:
A. HARKER,
C. W. WADE.